US007240218B2

(12) United States Patent
Kean (10) Patent No.: US 7,240,218 B2
(45) Date of Patent: Jul. 3, 2007

(54) METHOD OF USING A MASK PROGRAMMED KEY TO SECURELY CONFIGURE A FIELD PROGRAMMABLE GATE ARRAY

(75) Inventor: Thomas A. Kean, Edinburgh (GB)

(73) Assignee: Algotronix, Ltd., Edinburgh (GB)

( * ) Notice: Subject to any disclaimer, the term of this patent is extended or adjusted under 35 U.S.C. 154(b) by 1169 days.

(21) Appl. No.: 09/780,681

(22) Filed: Feb. 8, 2001

(65) Prior Publication Data

US 2001/0037458 A1 Nov. 1, 2001

Related U.S. Application Data (63) Continuation-in-part of application No. 09/747,759, filed on Dec. 21, 2000.

(60) Provisional application No. 60/181,118, filed on Feb. 8, 2000.

(30) Foreign Application Priority Data

Feb. 9, 2000 (GB) ............................ 0002829.0

(51) Int. Cl.
*H04L 9/32* (2006.01)

(52) U.S. Cl. ........................... 713/193; 713/170

(58) Field of Classification Search ............... 380/268; 713/200, 193–194, 170, 165, 189; 326/29, 326/39
See application file for complete search history.

(56) References Cited

U.S. PATENT DOCUMENTS

| 4,120,030 | A | 10/1978 | Johnstone |
| 4,465,901 | A | 8/1984 | Best |
| 4,525,599 | A | 6/1985 | Curran |
| 4,562,305 | A | 12/1985 | Gaffney |
| 4,603,381 | A | 7/1986 | Guttag |
| 4,633,388 | A | 12/1986 | Chiu |
| 4,847,902 | A | 7/1989 | Hampson |

(Continued)

FOREIGN PATENT DOCUMENTS

DE 43 41 880 A1 6/1995

(Continued)

OTHER PUBLICATIONS

Xilinx Inc . . . , "Xilinx User Guide and Tutorials", 1991, Section "Best of Xcell", p. 602, column headed "Design Security".

(Continued)

*Primary Examiner*—Hosuk Song
(74) *Attorney, Agent, or Firm*—Orrick, Herrington & Sutcliffe LLP (57) ABSTRACT

A field programmable gate array has security configuration features to prevent monitoring of the configuration data for the field programmable gate array. The configuration data is encrypted by a security circuit of the field programmable gate array using a security key. This encrypted configuration data is stored in an external nonvolatile memory. To configure the field programmable gate array, the encrypted configuration data is decrypted by the security circuit of the field programmable gate array using the security key stored in the artwork of the field programmable gate array. The secret key consists of a number of bits of key information that are embedded within the photomasks used in manufacture the FPGA chip.

6 Claims, 6 Drawing Sheets

U.S. PATENT DOCUMENTS

| | | | |
|---|---|---|---|
| 4,866,769 A | 9/1989 | Karp | |
| 4,878,246 A | 10/1989 | Pastor et al. | |
| 5,036,468 A | 7/1991 | Roselli | |
| 5,224,166 A | 6/1993 | Hartmann, Jr. | |
| 5,307,318 A | 4/1994 | Nemoto | |
| 5,349,249 A | 9/1994 | Chiang | |
| 5,386,469 A | 1/1995 | Yearsley | |
| 5,388,157 A | 2/1995 | Austin | |
| 5,596,512 A | 1/1997 | Wong et al. | |
| 5,644,638 A | 7/1997 | Thiriet | |
| 5,727,061 A * | 3/1998 | Johnson et al. | 713/165 |
| 5,768,372 A | 6/1998 | Sung et al. | |
| 5,773,993 A | 6/1998 | Trimberger | |
| 5,835,402 A | 11/1998 | Rao | |
| 5,898,776 A | 4/1999 | Apland | |
| 5,915,017 A | 6/1999 | Sung et al. | |
| 5,946,478 A | 8/1999 | Lawman | |
| 5,954,817 A | 9/1999 | Janssen et al. | |
| 5,963,104 A | 10/1999 | Buer | |
| 5,970,142 A | 10/1999 | Erickson | |
| 5,978,476 A | 11/1999 | Redman et al. | |
| 5,991,880 A | 11/1999 | Curd | |
| 6,005,943 A | 12/1999 | Cohen et al. | |
| 6,020,633 A | 2/2000 | Erickson | |
| 6,028,445 A * | 2/2000 | Lawman | 326/38 |
| 6,044,025 A * | 3/2000 | Lawman | 365/191 |
| 6,049,222 A * | 4/2000 | Lawman | 326/38 |
| 6,061,449 A | 5/2000 | Candelore | |
| 6,118,869 A | 9/2000 | Kelem | |
| 6,141,756 A | 10/2000 | Bright | |
| 6,151,677 A | 11/2000 | Walter et al. | |
| 6,198,303 B1 * | 3/2001 | Rangasayee | 326/38 |
| 6,212,639 B1 | 4/2001 | Erickson | |
| 6,233,717 B1 | 5/2001 | Choi | |
| 6,292,018 B1 * | 9/2001 | Kean | 326/41 |
| 6,324,286 B1 | 11/2001 | Lai et al. | |
| 6,324,288 B1 * | 11/2001 | Hoffman | 380/249 |
| 6,324,676 B1 * | 11/2001 | Burnham et al. | 716/16 |
| 6,325,292 B1 | 12/2001 | Sehr | |
| 6,356,637 B1 | 3/2002 | Garnet | |
| 6,481,632 B2 * | 11/2002 | Wentker et al. | 235/492 |
| 6,560,743 B2 * | 5/2003 | Plants | 714/763 |
| 6,615,349 B1 | 9/2003 | Hair | |
| 6,636,971 B1 * | 10/2003 | Loukianov | 713/189 |
| 6,640,305 B2 * | 10/2003 | Kocher et al. | 713/194 |
| 6,654,889 B1 * | 11/2003 | Trimberger | 713/191 |
| 6,658,566 B1 | 12/2003 | Hazard | |
| 6,857,076 B1 | 2/2005 | Klein | |
| 6,947,556 B1 | 9/2005 | Matyas et al. | |
| 6,957,193 B2 | 10/2005 | Stefik et al. | |
| 6,978,021 B1 | 12/2005 | Chojnacki | |
| 2002/0141588 A1 | 10/2002 | Rollins | |
| 2004/0111631 A1 * | 6/2004 | Kocher et al. | 713/194 |

FOREIGN PATENT DOCUMENTS

| | | |
|---|---|---|
| DE | 199 20 744 A1 | 11/2000 |
| WO | WO 97/25675 A1 | 7/1997 |
| WO | WO 98/40853 A1 | 9/1998 |
| WO | WO 98/58305 A1 | 12/1998 |
| WO | WO 99/46774 A1 | 9/1999 |
| WO | WO 00/49717 A2 | 8/2000 |
| WO | WO 01/08411 A1 | 2/2001 |

OTHER PUBLICATIONS

Xilinx Inc . . . , "XACT Reference Guide", 1993, Section 5 "Peripherals and Hardware", p. 602, subsection headed "Programming the XC3720".

John G. Proakis , "Digital Communications", 3rd edition, McGraw Hill, 1995 , Chapter 8. pp. 413-528.

John V. Oldfield and Richard C. Dorf, "Field Programmable Gate Arrays", Wiley-Interscience, 1995, Chapter 3, pp. 53-102.

Bruce Schneier , "Applied Cryptography", 2nd Edition. John-Wiley, 1996.

Actel Corp., "Protecting your Intellectual Property from the Pirates", presentation at DesignCon '98, 1998.

Atmel Corp., application note "Programming Specification for Atmel's AT17 and AT17A series FPGA configuration EEPROMs", 1999.

Triscend Inc., "Triscend E5 Configurable Processor Family", Product Description (Preview), Jul. 1999, Section "System Initialisation" p. 39-43.

Actel Corp., "60RS Family SPGA's", Advanced Data Sheet, Nov. 19, 1999.

Xilinx Inc., "Virtex 2.5V Field Programmable Gate Arrays," Advanced Product Specification, 1999, pp. 1-22.

Triscend Inc., "Implementing Secure Remote Updates using Triscend E5 Configurable System-on-Chip Devices", Application Note AN-02, Jan. 2000.

Intel Corp., "Intel Processor Identification and the CPU-IS Instruction", Application Note AP-485, Intel Corporation, Nov. 2000.

"Xilinx—A New Family of In-System Programmable FLASH Serial/Parallel PROMs", Jan. 12, 2000, [Retrieved from Internet Jul. 6, 2004], http://www.xilinx.com/xcell/x134/x134_21.pdf.

"TCP/IP Security", Jun. 12, 1998, [Retrieved from Internet Jul. 6, 2004], http://www.linuxsecurity.com/resource_files/documentation/tcpip-security.html.

"Xilinx XC4000XLA/XV Field Programmable Gate Arrays", Oct. 18, 1999, [Retrieved from Internet Jul. 6, 2004].

Pedram, Massoud, "Design Considerations for Battery-Powered Electronics", 2000, [Retrieved from Internet Feb. 24, 2005], http://atrak.usc.edu/~massoud/Papers/battery-dac99.pdf.

Dipert, Brian, "Cunning Circuits Confound Crooks", EDN, Oct. 12, 2000, pp. 103-112.

* cited by examiner

METHOD OF USING A MASK PROGRAMMED KEY TO SECURELY CONFIGURE A FIELD PROGRAMMABLE GATE ARRAY

This application claims priority to UK patent application GB 0002829.0, filed Feb. 9, 2000 and U.S. provisional patent application 60/181,118, filed Feb. 8, 2000, and is a continuation-in-part of U.S. patent application Ser. No. 09/747,759, filed Dec. 21, 2000, which are incorporated by reference along with all references cited in this application.

BACKGROUND OF THE INVENTION

This invention relates to integrated circuits such as field programmable gate arrays (FPGAs) which contain an on-chip volatile program memory which must be loaded from an off-chip nonvolatile memory when power is applied before normal operation of the device can commence.

Field programmable gate arrays (FPGAs) constitute a commercially important class of integrated circuit which are programmed by the user to implement a desired logic function. This user programmability is an important advantage of FPGAs over conventional mask programmed application specific integrated circuits (ASICs) since it reduces risk and time to market.

The function of the FPGA is determined by configuration information stored on the chip. Several technologies have been used to implement the configuration store: most notably static random access memory (SRAM), antifuse and flash erasable programmable read only memory (EPROM). The SRAM programmed FPGAs have dominated in the marketplace since they have consistently offered higher density and operating speed than devices using the other control store technologies. SRAM devices can be implemented on standard complementary metal oxide semiconductor (CMOS) process technology whereas antifuse and Flash EPROM technologies require extra processing steps. SRAM devices are normally built on process technology a generation ahead of that used in the other devices. For example, today the most advanced SRAM programmed FPGAs are available implemented on 0.18 micron technology whereas the most advanced nonvolatile FPGAs are on 0.25 micron technology. The smaller transistors available on the advanced processes provide a speed and density advantage to SRAM programmed FPGAs. Additional details of the operation of FPGAs and their control memory are given in standard textbooks including John V. Oldfield and Richard C. Dorf *Field Programmable Gate Arrays*, published by Wiley-Interscience in 1995.

Unlike antifuse and FLASH EPROM which maintain their state after power is turned off, SRAM is a volatile memory which loses all information on power off. Therefore, SRAM programmed FPGAs must have a configuration bitstream loaded into them immediately after power is applied: normally this configuration information comes from a serial EPROM. A serial EPROM is a small, nonvolatile memory device which is often placed adjacent to the FPGA on the printed circuit board and which is connected to it by a small number of wires. The programming information may also come from a parallel access EPROM or other type of memory or a microprocessor according to the requirements of the system containing the FPGA.

A shortcoming of FPGAs, especially SRAM programmed FPGAs, is a lack of security of the user's design because the configuration bitstreams may be monitored as they are being input into the FPGA. This security issue is one of the few remaining advantages of FPGAs based on nonvolatile memory over SRAM programmed FPGAs. It is very difficult to "clone" a product containing a mask programmed ASIC or one of the nonvolatile FPGAs. Cloning an ASIC involves determining the patterning information on each mask layer which requires specialist equipment and a significant amount of time. It is also difficult to copy configuration information loaded into the nonvolatile FPGA technologies after their "security fuses" have been blown—thus these devices are attractive to customers who have concerns about their design being pirated or reverse engineered. Vendors of FPGAs which use nonvolatile programming memory often refer to the security advantages of their technology over SRAM programmed parts in their marketing literature. As an example, "Protecting Your Intellectual Property from the Pirates" a presentation at DesignCon 98 by Ken Hodor, Product Marketing Manager at Actel Corporation gives the view of the major vendor of antifuse FPGAs on the relative security of antifuse, FLASH and SRAM based FPGAs.

This security problem of SRAM FPGAs has been well known in the industry for at least 10 years and to date no solution attractive enough to be incorporated in a commercial SRAM FPGA has been found. Some users of SRAM FPGAs have implemented a battery back up system which keeps the FPGA powered on in order to preserve its configuration memory contents even when the system containing the FPGA is powered off. The FPGA bitstream is loaded before the equipment containing it is shipped to the end user preventing unauthorized access to the bitstream information. Present day FPGAs have a relatively high power consumption even when the user logic is not operating: which limits the life span of the battery back up. If power is lost for even a fraction of a second the system the FPGA control memory will no longer be valid and the system will cease to function. This raises concerns about the reliability of a system which uses this technique. Thus, this prior art approach to protecting FPGA bitstreams is only applicable to a small fraction of FPGA applications.

As can be appreciated, there is a need for improved techniques and circuitry for secure configuration of FPGAs.

SUMMARY OF THE INVENTION

The invention is a field programmable gate array with security configuration features to prevent monitoring of the configuration data for the field programmable gate array. The configuration data is encrypted by a security circuit of the field programmable gate array using a security key. This encrypted configuration data is stored in an external nonvolatile memory. To configure the field programmable gate array, the encrypted configuration data is decrypted by the security circuit of the field programmable gate array using the security key stored in the artwork of the field programmable gate array. The secret key consists of a number of bits of key information that are embedded within the photomasks used in manufacture the FPGA chip.

Design piracy in which a competitor makes illegal cloned products by copying FPGA bitstream memories is normally of concern because of loss of revenue rather than because it is essential to prevent any unauthorized products for security reasons. Therefore, it can be combated by techniques which make it uneconomic rather than impossible to manufacture cloned products. FPGAs can be manufactured with one of two or more secret keys (e.g., key A and key B) embedded in the artwork of the design. After manufacturing the FPGA chips manufactured with the masks encoding key A are mixed together with those manufactured using the masks encoding key B and the packages are marked identically. A customer who bought FPGAs has no way of telling which secret key was present on a particular chip. If the customer was a pirate who had a secure bitstream that he had copied illegally and wished to use in cloned equipment he would have a problem: since the bitstream can only be decrypted by an FPGA with the matching secret key only 50% of the FPGAs that he bought would actually work with his copied bitstream. This would place him in a considerable economic disadvantage compared with the creator of the design who can load an unencrypted bitstream into any FPGA and have it generate a secure bitstream using whatever key is implanted on chip.

In an embodiment, the invention is a method including fabricating a first group of FPGA integrated circuits with a first secret key embedded by way of a first mask set. The method includes fabricating a second group of FPGA integrated circuits with a second secret key embedded by way of a second mask set. The first group of FPGA integrated circuit provides the same logical functionality as the second group of FPGA integrated circuits. In a specific embodiment, the only difference between the first group of FPGAs and second group of FPGAs is having a different secret key or security key. A first secure bitstream will configure properly user-configurable logic of the first group of FPGA integrated circuits, but not the second group of FPGA integrated circuits.

In an embodiment, the first group of FPGA integrated circuits with the first secret key may be assigned to a first geographic area and the second group of FPGA integrated circuits with the second secret key may be assigned to a second geographic area. In another embodiment, the first group of FPGA integrated circuits with the first secret key are fabricated in a first time period and the second group of FPGA integrated circuits with the second secret key are fabricated in a second time period, different from the first time period. The first time period may be about the same duration as the second time period. In a further embodiment, the first group of FPGA integrated circuits with the first secret key are assigned to a first customer and the second group of FPGA integrated circuits with the second secret key are assigned to a second customer.

In an embodiment, only one mask differs between the first and second mask sets. The one mask that differs may be a contact mask. In another embodiment, there are random differences between artwork of the first and second group of FPGA integrated circuits in addition to the different embedded secret keys.

The method further includes loading an unencrypted bitstream into one of the first group of FPGA integrated circuits to generate a secure bitstream using the first secret key. The first and second secret keys may be presented on wires of the respective group of FPGA integrated circuits for only a limited duration. The first secret key may be embedded by setting an initial state of a selection of memory cells in a device configuration memory of the FPGA integrated circuit. In an embodiment, the first secret key is extracted by using a CRC algorithm to compute a checksum of the initial state of the device configuration memory. Alternatively, the first secret key may be embedded by changes to a relatively large block of logic (e.g., logic like configurable logic, AND gates, OR gates, flip-flops, and look-up tables) in the first plurality of FPGA integrated circuits and its value extracted using a CRC algorithm.

In another embodiment, the invention is a method including embedding a first secret key within the artwork of an FPGA integrated circuit. A user-defined second secret key is stored within an encrypted FPGA bitstream, which will be stored in an external nonvolatile memory accessible by the FPGA. The user-defined second secret key is decrypted using the first secret key. A secure network link is set up between the FPGA and a server using the user-defined second secret key. Further, the method may include downloading an FPGA bitstream using the secure network link. The downloaded FPGA bitstream is encrypted using the first secret key. The encrypted downloaded bitstream is stored in the external memory. The secure network link may be created using a standard internet security protocol. The FPGA is configured using the encrypted downloaded bitstream stored in the external memory.

In another embodiment, the invention is a method including storing a first secret key on an FPGA chip. The FPGA calculates a message authentication code (MAC) corresponding to a user design. The message authentication code is stored with bitstream information in a nonvolatile memory. Furthermore, copyright messages may be stored with the bitstream information. Unauthorized alterations to the bitstream may be detected using the message authentication code. Bitstreams which have been altered are prevented from being used to configure an FPGA.

The message authentication code along with corresponding identification information for a product containing the FPGA may be recorded. The message authentication code stored in the nonvolatile memory of a product containing a pirated FPGA design is examined. This will enable determining of the identity of the customer to whom the pirated FPGA was originally supplied using a record of MACs and corresponding product identification.

A feature of this invention is to provide a cryptographic security protocol which prevents unauthorized third parties from reverse engineering FPGA bitstreams or benefiting economically from manufacturing clone products containing pirate copies of FPGA bitstreams.

Another feature of this invention is to provide this security without requiring on chip nonvolatile memory cells or individual customization steps for every chip in the manufacturing process.

Another feature of this invention is to prevent pirates from removing copyright messages from cloned designs and to allow FPGA users to trace the individual product unit from which a design has been cloned.

A further feature of this invention is to provide an FPGA implemented with a standard processing flow that can securely store cryptographic keys needed to support a protocol for securely downloading programming information over a communications network into an external memory.

This invention further provides security without compromising the ease of manufacture of the SRAM FPGAs, without complicating the Computer Aided Design tools for the SRAM FPGAs, and without removing the user's ability to reprogram the SRAM FPGAs many times.

Further features and advantages of the invention will become apparent from a consideration of the drawings and ensuing description.

DETAILED DESCRIPTION

Figure 1:
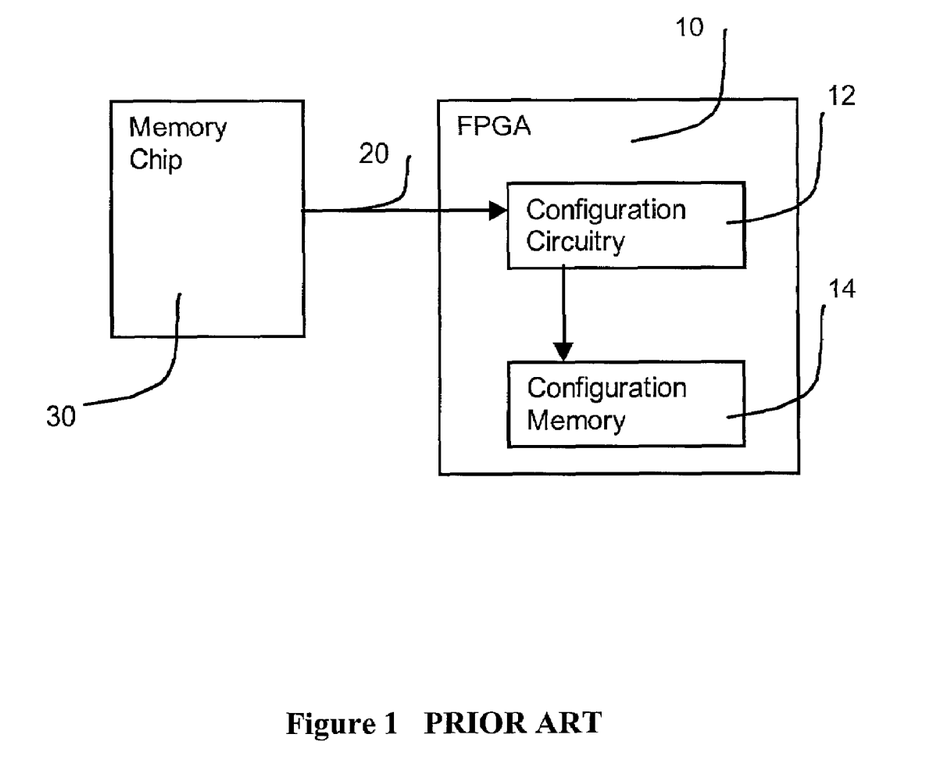
FIG. 1 shows a prior-art structure for configuring an FPGA from an external memory.

FIG. 1 shows a prior art SRAM programmed FPGA 10 connected to a memory chip 30 via a set of signal traces 20 on a printed circuit board. Configuration circuitry 12 on the FPGA loads programming data from memory 30 into on chip configuration memory 14. Resources on the FPGA not related to programming (such as the logic gates and routing wires which implement the user design) are not shown in this or subsequent illustrations for reasons of clarity but are well understood and are described in manufacturer's literature such as Xilinx Inc. "Virtex 2.5V Field Programmable Gate Arrays," Advanced Product Specification, 1998 and the Oldfield and Dorf textbook mentioned above. Set of signals 20 will normally include a data signal to transfer configuration information, a clock signal to synchronize the transfer and several control signals to specify a particular mode of transfer (for example when a sequence of FPGAs can be daisy chained to a single source of programming data). The exact number and function of programming signals 20 varies from manufacturer to manufacturer and product line to product line. The specific signals for a market leading FPGA product are documented in the Xilinx literature cited above.

Programming signals 20 can be monitored by a malicious party who can then make a copy of the bitstream transferred across them. This could be done, for example, by attaching a probe or probes from a logic analyzer to those pins of FPGA 10 concerned with the programming interface.

Figure 2:
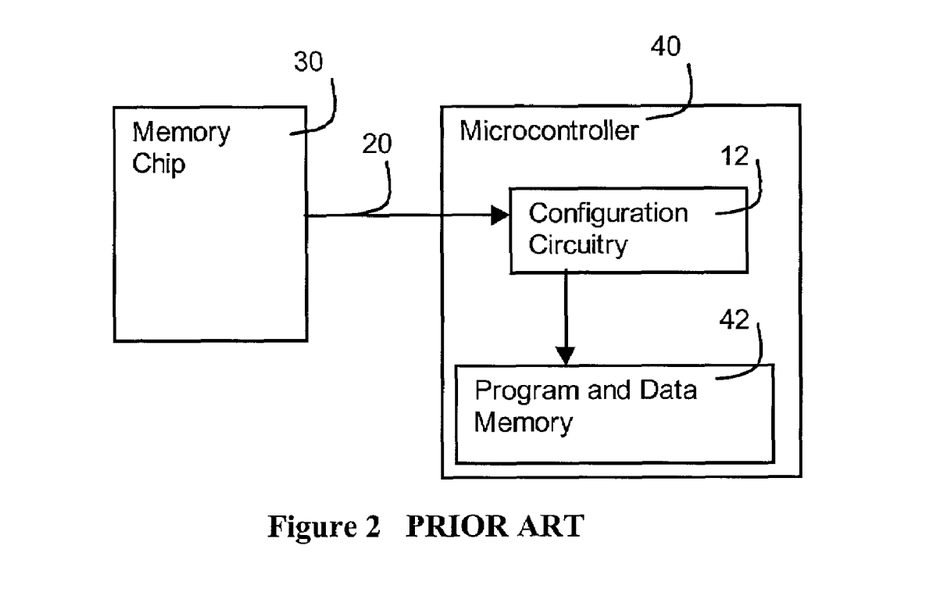
FIG. 2 shows a prior art structure for configuring a microcontroller with an-chip program and data memory from an external memory.

FIG. 2 shows a prior art microcontroller 40 which contains configuration circuitry 12 to load initial values for an on chip memory block 42 from a serial EPROM on power up. On chip memory 42 may contain a program to be executed by the microcontroller or data tables for use by the microcontroller. Depending on the microcontroller architecture it might be convenient for memory 42 to be composed of several smaller memories: for example there may be separate memories for program code and data. The function of configuration circuitry 42 may be wholly or partly implemented by software running on the microcontroller and stored in an on chip mask programmed Read Only Memory (ROM). The security problem is the same as that faced by the FPGA: an attacker can copy the programming information as it passes between the external memory and the microcontroller on chip SRAM memory.

Figure 3:
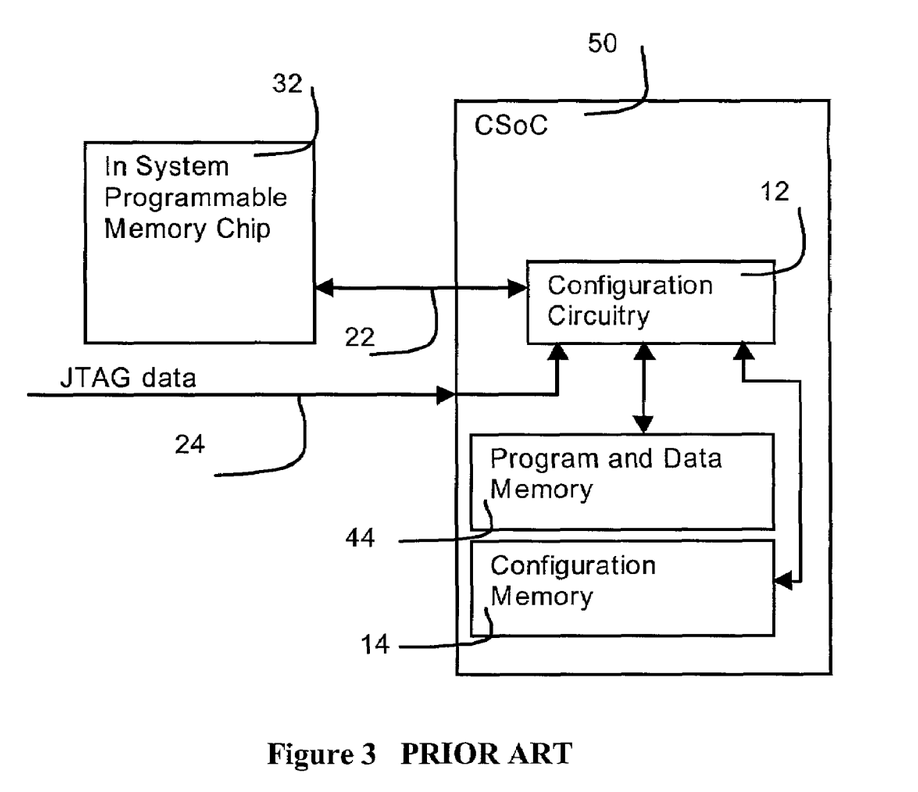
FIG. 3 shows a prior-art structure for configuring a Configurable System on Chip integrated circuit from an external memory.

Recently, Configurable System on Chip (CSoC) devices have become available commercially which contain both a microcontroller with a volatile on-chip program memory and a block of SRAM programmed logic: both the microcontroller program memory and the programmable logic configuration memory must be loaded from an external nonvolatile memory on power on. Details of one such device are given in Triscend Corporation, "Triscend E5 Configurable Processor Family," Product Description (Preview), July 1999. The Triscend CSoC can be programmed from a serial EPROM in the same way as an FPGA but also offers a convenient additional feature illustrated in FIG. 3. Configuration data can be downloaded to the CSoC 50 through an industry standard Joint Test Action Group (JTAG) interface and the CSoC itself can then program an In System Programmable (ISP) external memory 32 with the data. The external memory could be an SRAM but would normally be a serial or parallel EPROM or Flash EPROM. The CSoC implements the programming algorithm for the nonvolatile memory: the on chip-microcontroller allows CSoC devices to implement relatively complex configuration algorithms in software. This feature simplifies manufacturing a system containing a CSoC since the ISP memory chip 32 need not be programmed prior to installation on the Printed Circuit Board (PCB).

There are two main ways in which a malicious party might make use of captured bitstream information. The more serious threat, at the present time, is that a pirate may simply copy the bitstream information and use it unchanged to make unauthorized copies or clones of the product containing the FPGA without any understanding of how the FPGA implements its function. The second threat is that the attacker might reverse engineer the design being loaded into the FPGA from bitstream information. Reverse engineering an FPGA design would require significant effort because automated tools for extracting design information from the bitstream are not generally available. Should such tools be created and distributed in the future reverse engineering would become a very serious threat.

This security issue is one of the few remaining advantages of FPGAs based on nonvolatile memory over SRAM programmed FPGAs. It is very difficult to clone a product containing a mask programmed ASIC or one of the non-volatile FPGAs. Cloning an ASIC involves determining the patterning information on each mask layer which requires specialist equipment and a significant amount of time. It is also difficult to copy configuration information loaded into the nonvolatile FPGA technologies after their security fuses have been blown—thus these devices are attractive to customers who have concerns about their design being pirated or reverse engineered. Vendors of FPGAs which use non-volatile programming memory often refer to the security advantages of their technology over SRAM programmed parts in their marketing literature. As an example, "Protecting Your Intellectual Property from the Pirates" a presentation at DesignCon 98 by Ken Hodor, Product Marketing Manager at Actel Corporation gives the view of the major vendor of antifuse FPGAs on the relative security of anti-fuse, FLASH and SRAM based FPGAs.

This security problem of SRAM FPGAs has been well known in the industry for at least 10 years and to date no solution attractive enough to be incorporated in a commercial SRAM FPGA has been found. Some users of SRAM FPGAs have implemented a battery back up system which keeps the FPGA powered on in order to preserve its configuration memory contents even when the system containing the FPGA is powered off. The FPGA bitstream is loaded before the equipment containing it is shipped to the end user preventing unauthorized access to the bitstream information. Present day FPGAs have a relatively high power consumption even when the user logic is not operating: which limits the life span of the battery back up. If power is lost for even a fraction of a second the system the FPGA control memory will no longer be valid and the system will cease to function. This raises concerns about the reliability of a system which uses this technique. Thus, this prior art approach to protecting FPGA bitstreams is only applicable to a small fraction of FPGA applications.

There are two main problems which have up till now prevented the industry from introducing security to SRAM programmed FPGAs.

Firstly, in order to provide security against pirated bitstreams prior art techniques have required a nonvolatile memory on the FPGA chip or chip by chip customization during manufacture. This is, in itself, a considerable drawback for the FPGA manufacturer since it is highly desirable to use a completely standard manufacturing flow.

A second problem with implementing a unique identifier on every FPGA and using this identifier to prevent a bitstream for one FPGA from successfully configuring a second is that it seriously complicates the manufacturing of equipment containing the FPGAs. It is necessary to create a different bitstream for each FPGA based on its unique identifier: therefore the CAD tools must keep track of the unique identifier of the device to be configured. This can cause serious inconvenience to the user and manufacturer of the FPGA.

Figure 4:
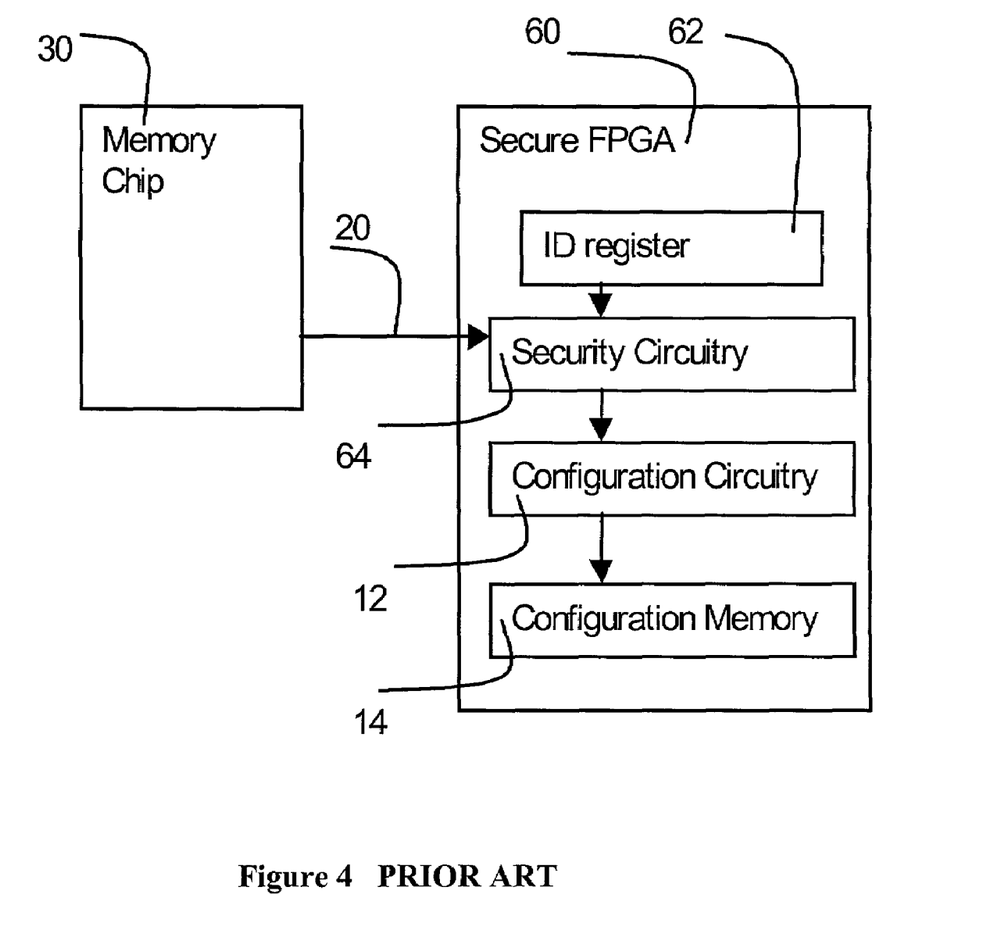
FIG. 4 shows a prior-art structure for securely programming an FPGA.

FIG. 4 shows an FPGA containing security circuitry 64 and an on-chip nonvolatile ID memory 62. Security circuitry 64 is coupled between off-chip non volatile storage 30 and configuration circuitry 12 and is also coupled to the nonvolatile ID memory 62. The device manufacturer installs a unique key in the ID memory at the time of manufacture and provides this key to the customer who purchases the FPGA. The customer can then use this key to create a security enhanced encrypted bitstream for this particular FPGA and program this bitstream into serial EPROM. When configuration data is loaded into the FPGA security circuitry decrypts and verifies it using the key data in ID memory 62. In this case a malicious party who copied the bitstream passing between the FPGA and microcontroller would not be able to use this information to make a pirate copy of the user's equipment (since the secure FPGA bitstream would only configure the particular FPGA it was generated for). If the security algorithm involved encrypting the bitstream it would also be impossible or very difficult for the malicious party to reverse engineer the customer design.

This form of bitstream security causes inconvenience to both the FPGA manufacturer and customers. The manufacturer faces the following problems:

1. The FPGAs now require a customization stage after manufacturing to individualize the ID memory. This may involve, for example, cutting metal traces with a laser, or programming on chip antifuses or floating gate memory cells.

2. After customization the chips require a customized programming stream. This complicates testing since it is no longer possible to use identical vectors for each chip.

3. A security system must be put in place in the manufacturer's facility to protect the identifiers being installed into the chips.

4. The manufacturer must have a secure delivery method for supplying the secret identifiers to the customers who purchased the FPGAs in an easy to use manner. It must also be easy for the customer to match the identifiers supplied with the particular device being programmed in an automated manufacturing environment.

The customer also faces additional problems:

1. The customer must provide a secure environment for handling and storing the device IDs.

2. The customer must have a database or other system which allows them to find the correct ID for a given chip each time it is to be reprogrammed and supply the ID to the bitstream generation computer aided design (CAD) program. This will be of particular concern in the development process or when making improvements or corrections to products in the field.

3. It is not possible to batch program many serial EPROMs with a common configuration prior to assembly onto the printed circuit board. The fact that each serial EPROM must contain a different configuration thus complicates equipment manufacturing.

4. The customer must trust the FPGA manufacturer since the manufacturer has access to the ID information and could, in theory, decrypt the bitstream for any customer design.

It can be seen that keeping the device IDs secure is a significant practical problem which would cause considerable inconvenience to FPGA manufacturers and their customers. The security infrastructure makes it harder to make use of one of the benefits of SRAM based FPGAs: their ability to be reprogrammed many times. Standard FPGAs with no bitstream security do not require tracking of individual chip ID codes in order to create a usable bitstream. The fact that the device IDs must be stored on computer systems at both the FPGA manufacturer and customer and kept available in case reprogramming is required potentially compromises security by providing opportunities for unauthorized access to key information.

Although the above discussion has focussed on FPGAs, since these are the most commercially important class of integrated circuit which make use of a volatile on chip program memory it is applicable to any integrated circuit which must load an on chip volatile program memory from an off-chip nonvolatile memory. This might include other forms of programmable logic such as Complex Programmable Logic Devices, routing chips such as Field Programmable Interconnect Components (FPICs) or microcontrollers which use a block of on chip SRAM to store program code. It would also be applicable to hybrid components like the CSoC mentioned above which had more than one class of SRAM programmed circuit: for example chips which contain a microcontroller and an SRAM programmed FPGA. It would be obvious to one skilled in the art that the method of securely configuring an FPGA described here could equally well be applied to these and many other classes of component which use a volatile on chip program memory and although the term FPGA is used throughout for convenience it is not intended that the disclosure or its claims are limited to FPGAs.

Figure 5:
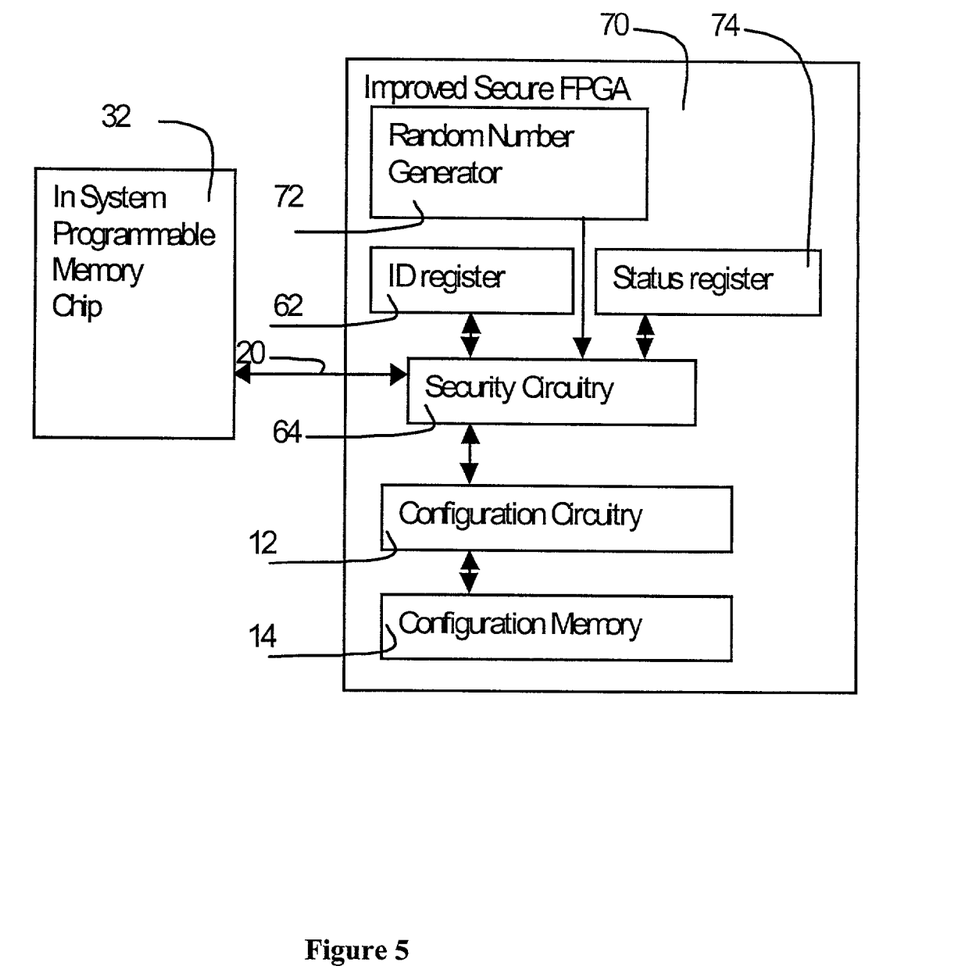
FIG. 5 shows a secure FPGA according to this invention.

FIG. 5 shows an improved secure FPGA 70 disclosed in the applicant's application GB9930145.9 and U.S. provisional patent application 60/181,118, filed Feb. 8, 2000 which provide the security of the FPGA 60 in FIG. 4 without compromising ease of use. The present application is related to the applicant's application GB 9930145.9 "Method and Apparatus for Secure Configuration of a Field Programmable Gate Array." That application describes an improved method of securing the FPGA configuration which does not require the provision of nonvolatile memory on the FPGA. Although the technique disclosed in this application is particularly suited to being used in conjunction with the technique disclosed in this earlier application, it can also be used with many other techniques for securing the external program memory of an FPGA, microcontroller, or similar device.

In FIG. 5, for reasons of clarity resources on the FPGA not related to programming are not shown. Random number generator 72 is coupled to the security circuitry 64 and can be used to generate a random ID code. Such a code should be at least 40 bits long and would preferably be between 100 and 200 bits. The ID code is acts as a cryptographic key and the normal considerations applicable to choosing the length of a cryptographic key would apply. As compute power increases in the future longer keys lengths may be required. With a sufficiently long ID code and a high quality random number generator it is extremely unlikely that two FPGAs would generate the same ID. Security circuitry 64 can load the ID code into the device ID register 62 and it can also read the ID code from the register when required. The device ID register is nonvolatile and its contents are preserved when the power is removed from the FPGA. Only the security circuitry 64 can access the output of the ID register: the value stored in the ID register is never available off-chip. Security circuitry 64 is also coupled to the off-chip non-volatile ISP memory 32 and the configuration circuitry 12. Security circuitry 64 and configuration circuitry 12 process data coming from the off-chip memory prior to writing it to the on-chip memory in the same way as the system of FIG. 4. Additionally, in the improved secure FPGA 70, security circuitry 64 and configuration circuitry 12 can also process data read out of on chip configuration memory 14 encrypt it and write it to the off-chip in-system programmable memory 32 through signals 20. This encryption can use the ID value stored in the ID register as a key. Status Register 74 is provided in a preferred embodiment as a small nonvolatile memory for use by the security circuitry to store the configuration status of the device while power is not applied, this allows extra flexibility in device configuration.

To appreciate the benefit of the structure presented in FIG. 5 it is necessary to consider the various stages in the life of an SRAM FPGA chip. As an illustration we will assume that the FPGA chip is sold to a customer in the computer networking industry who uses it in an Internet Protocol (IP) router product. This example is provided only to make the concepts being discussed more concrete, the invention is not limited to any particular application area of FPGA chips.

1. Manufacture. When it leaves the manufacturer's premises the FPGA is completely functional but does not contain any kind of proprietary design. Thus, there is no need to be concerned that bitstream information might be copied or pirated at this stage.

2. Customer Programming. The FPGA customer installs the FPGA chip in equipment which is to be supplied to its own customers (the end users of the FPGA). For example, in this case the FPGA chip might be installed on a printed circuit board which forms part of an IP router. This customer must also develop a proprietary design to configure the FPGA to implement the functions required by the IP router and store the bitstream (created using computer aided design (CAD) tools supplied by the FPGA manufacturer) in a nonvolatile memory within the system. It is this bitstream information which must be protected from piracy or reverse engineering.

3. End User. The FPGA customer supplies their IP router product to an end user. After it leaves the FPGA customer's premises the equipment containing the FPGA may fall into the hands of a malicious party who wishes to pirate or reverse engineer the customer FPGA design. A pirate who obtains a copy of the bitstream could then build clones of the customer's IP protocol router product containing FPGAs which were loaded with the pirated bitstream.

As described above the purpose of the security circuitry is to prevent sensitive information from appearing on signals 20 which may be monitored by a malicious party. However, as can be seen from the description of the FPGAs lifecycle this is only a concern after the equipment containing the FPGA leaves the FPGA customer's facility. The FPGA customer has created the design in the FPGA and can access all the CAD files (including schematics or VHDL source and the bitstream itself) associated with it, therefore, there is no reason to protect the FPGA bitstream while the FPGA is within the customer's premises.

Normally, an FPGA customer will power up a system containing an FPGA in their facility prior to shipping it to the end user in order to test that it is functional. If the customer always powers on the equipment within his facility before shipping the equipment the signals 20 may transmit sensitive information the first time the FPGA is powered up in the system, however, subsequent transfers of data across the signals 20 must be protected.

This observation leads to a method for using the structure of FIG. 5 to implement bitstream security consisting of the following steps:

1. The customer places a standard, insecure, FPGA bitstream in the nonvolatile memory. This bitstream contains a small amount of header information which indicates to the FPGA that it is an insecure bitstream but should be converted into a secure one.

2. The FPGA security circuitry loads the FPGA bitstream and determines, based on the header information, that security must be applied. It also determines that the bitstream is insecure and passes it directly to the FPGA configuration circuitry without change.

3. The FPGA security circuitry causes the random number generator to create a new key and loads this key into the device ID register.

4. After the entire FPGA is configured the security circuitry reads back the bitstream information from the configuration memory and processes it, based on the key information in the device ID register, to form a secure bitstream. This secure bitstream is then written back to the off-chip nonvolatile memory overwriting and obliterating the original insecure bitstream information. The header information on this new secure bitstream is changed to indicate that it is a secure bitstream.

After this step a link has been established between the FPGA and the off-chip nonvolatile memory: the bitstream in the off-chip memory will not successfully configure any other FPGA. The unencrypted form of the bitstream is no longer present in the external memory. Since the bitstream is encrypted accessing the bitstream will not help in reverse engineering the user design. After these steps the FPGA is properly configured and operating normally allowing the equipment to be tested. Power will be removed before the product containing the FPGA is shipped to the end user. The next time power is applied to the FPGA (which may happen outside the customer's premises) the following steps will take place:

1. The FPGA begins to load the secure bitstream from the nonvolatile memory and determines from the header flags that it is a secure bitstream.

2. The security circuitry processes the secure bitstream using the secret information in the device ID register to verify it and create a standard insecure bitstream.

3. This standard bitstream is passed on to the configuration circuitry which loads it into the configuration memory.

4. Assuming the security circuitry does not detect any problems with the bitstream the FPGA is enabled and operates normally after configuration. If a problem is detected the security circuitry might blank the on chip configuration memory and disable the user input/output pins or take other appropriate steps to ensure the spurious design is not activated.

At any time the user can reprogram the external memory with a new design: if security is required the FPGA will generate a new ID code and encrypt it using the method outlined above.

Figure 6:
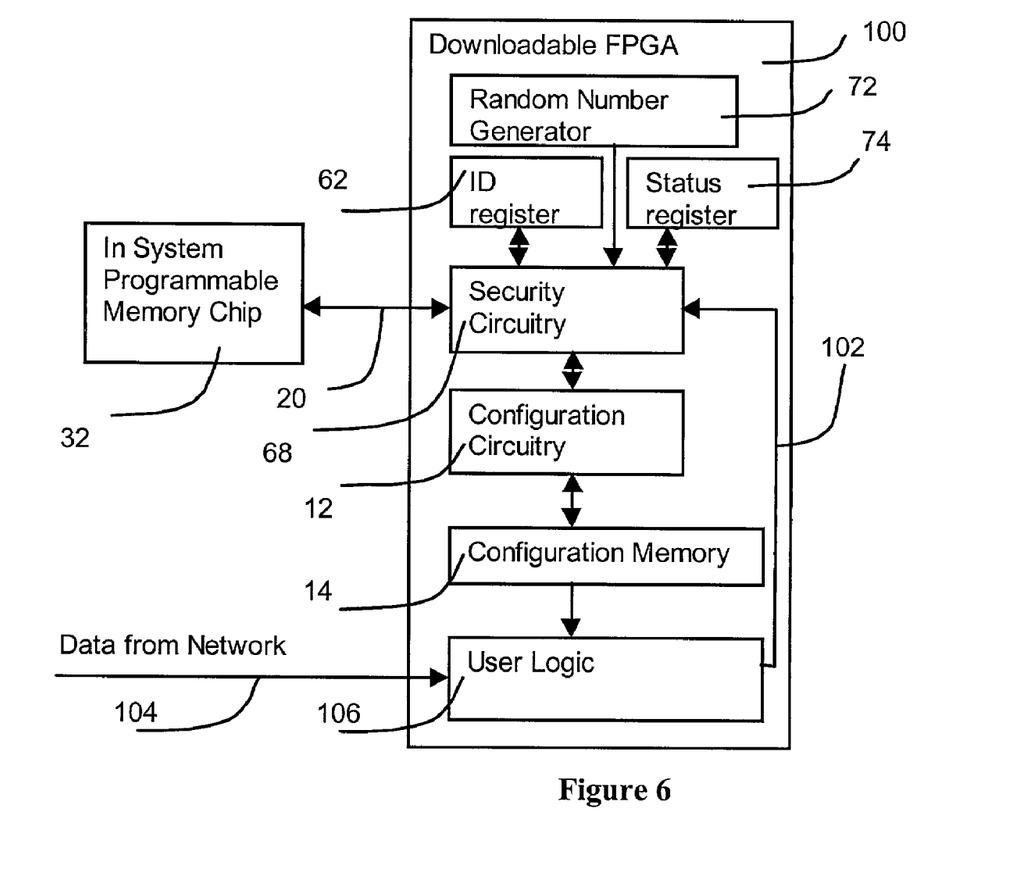
FIG. 6 shows a secure FPGA which can download configuration data from a communications network.

FIG. 6 shows an FPGA 100 according to application GB9930145.9 which supports secure download of bitstream information. Random number generator 72, ID register 62, status register 74, configuration circuitry 12 and configuration memory 14 have the same function as in the description of FIG. 5 above. User logic 106 is shown in this diagram but has been omitted from earlier figures: in this case a portion of the user logic is used to implement the download security algorithm. Data 104 from a communications network is supplied to the user logic through conventional user Input/Output pins on the FPGA. On chip connection 102 between the security circuitry and the user logic is provided to transfer downloaded program data to the security circuitry after decryption by the user logic. The security circuitry will then encrypt this data using the key in ID register 64 before storing it in external memory 32. Thus the plaintext programming data is never available off-chip where it could be monitored by a malicious party.

Although the structure of FIG. 5 described above obviates many of the problems of prior-art bitstream security circuits it requires some form of on-chip nonvolatile memory to implement nonvolatile ID register 62. This can complicate manufacturing flow and may increase wafer cost or prevent the use of the highest performance CMOS processes. From an FPGA manufacturer's point of view it is desirable that the bitstream security circuit be implemented on a standard CMOS process with a standard manufacturing flow.

There are two separate requirements on an FPGA bitstream security circuit:

1. It should prevent pirating user designs by making copies of the bitstream in the configuration memory.

2. It should prevent reverse engineering of the user design by analyzing the bitstream.

The second requirement is the more important since if it is not met an attacker can easily defeat any circuitry to enforce the first requirement. This is because if an attacker has reverse engineered design files he can easily use the FPGA vendor CAD tools to create a new bitstream file. The attacker also has the ability to make alterations or modifications to the customer design to better suit his own product and make determination that the design was copied more difficult.

Protection against design reverse engineering can be provided by encrypting the design using a secret key stored on the FPGA. The prior art schemes described above assumed that a unique key is required for each FPGA but this is not the case. Every FPGA could have the same secret key provided that the key remains secret. Naturally, if there is only a single secret key for all FPGAs then the consequences of the key becoming generally available are much worse than if every FPGA has a different key. It is likely that since a single key is more valuable (because it can decrypt any user design) an attacker would be willing to devote more resources to cryptanalysis or physical analysis of the FPGA in order to determine the key.

Design piracy in which a competitor makes illegal cloned products by copying FPGA bitstream memories is normally an economic rather than a security issue for an FPGA user. That is, the FPGA customer's concern is normally the loss of revenue resulting from unauthorized clones of its product rather than a security threat resulting from any unauthorized clones of the product being available. Thus, for most customers it is not necessary for a protection scheme to absolutely prevent use of copied bitstreams—it must only make it economically unattractive to manufacture cloned products using copied bitstreams.

A cryptographic scheme in which a single secret key is used for all FPGAs apparently provides no security against design piracy since the encrypted bitstream can be copied and used on any FPGA. Therefore, in the prior art it is assumed that every FPGA must have a unique key in order to prevent design piracy. This may be true if the goal is to prevent piracy absolutely, however, if the goal is to make piracy economically unattractive it is not necessary to have a unique key on every FPGA.

Imagine that FPGAs were manufactured with one of two secret keys (key A and key B) embedded in the artwork of the design. After manufacturing the FPGA chips manufactured with the masks encoding key A were mixed together with those manufactured using the masks encoding key B and the packages were marked identically. A customer who bought FPGAs could have no way of telling which secret key was present on a particular chip. If the customer was a pirate who had a secure bitstream that he had copied illegally and wished to use in cloned equipment he would have a problem: only 50% of the FPGAs that he bought would actually work with his copied bitstream. This would place him at a considerable economic disadvantage compared with the creator of the design who can load an unencrypted bitstream into any FPGA and have it generate a secure bitstream using whatever key is implanted on chip.

Of course, the situation in which there are exactly two secret keys is just one possibility. The manufacturer could equally well have 5 variant keys or 100 and might have a policy of changing the keys every month or assigning particular keys to particular geographic regions. By increasing the number of variant keys the manufacturer increases the number of FPGAs a pirate would expect to have to buy to find one that worked with a given bitstream. If the keys are changed at regular intervals the pirate will only have a finite period in which he can make use of a pirated bitstream. By assigning different keys to FPGAs supplied in different geographic areas the manufacturer can make it difficult for a pirate located in a region with lax law enforcement to manufacture cloned equipment based on a design copied from equipment manufactured in another country. By assigning a special key to a particular customer or group of customers who buy very large numbers of FPGAs the manufacturer can ensure that a pirate will be unable to buy FPGAs which will run bitstreams copied from those customers products on the general market. This could be done by using separate keys for FPGAs supplied to corporate accounts and distribution accounts.

Since only a relatively small number of keys is required it is practical to embed the key information in the mask set used to pattern the wafers during the manufacture of the FPGA chip, this technique of hiding a small amount of secret data in a much larger data set is termed steganography and can provide a high level of security for the key information. It is likely to be significantly more secure against physical analysis than a solution which used a small localized nonvolatile memory to implement the key storage.

Advantages of this method of securing FPGA bitstreams when used in conjunction with the techniques disclosed in application GB 9930145.9 include:

1. The cryptographic key is never transferred outside the chip making it very difficult for unauthorized parties to obtain its value.

2. The FPGA CAD tools need only produce standard, unencrypted bitstreams and need not keep track of device identifiers.

3. The user may change the design to be implemented by the FPGA at any time simply by reconfiguring the external memory with a new design.

4. A manufacturer may install identically configured serial EPROMs on all boards without compromising security, provided that the boards are powered on at least once before leaving his facility.

5. The technique is upwards compatible with existing methods of configuring FPGAs: thus an FPGA can be created which is compatible with prior art bitstreams as well as supporting this secure technique.

6. The FPGA can be used with standard In System Programmable serial EPROMs—the serial EPROMs need contain no additional security circuitry.

Thus, this technique provides the design security offered by nonvolatile FPGA technologies without compromising the density, performance or ease-of-use of SRAM FPGAs.

The invention improves the security system described in the applicants application GB 9930145.9 by removing the need for on-chip nonvolatile key memory. This application covered the cryptographic protocols used in some detail and for this reason they are described only briefly here.

The textbook, "Applied Cryptography," by Bruce Schneier $2^{nd}$ Edition. John-Wiley, 1996 gives sufficient detail to allow one skilled in the art to implement the various cryptographic algorithms discussed below. It also includes computer source code for many of the algorithms.

The presently preferred technique for use in the security circuitry 64 is a symmetric block cipher in Cipher Block Chaining (CBC) mode. Many such ciphers are known in the art and would be suitable for this application including RC2, RC4, RC5 and IDEA. The best known such cipher is the Data Encryption Standard (DES). DES is often operated in a particularly secure mode called Triple DES in which the basic DES function is applied three times to the data using different keys: the details are presented on page 294 of the Schneier textbook referenced above.

Cipher Block Chaining mode is explained in detail in the section starting on page 193 of the Schneier textbook, the computation of the Message Authentication Code is described on page 456. These techniques have also been described in various national standards documents and are in common use in the industry.

Cipher Block Chaining mode has two important advantages in this application:

1. The feedback mechanism hides any structure in the data. FPGA configurations are very regular and large amounts of information about the design could be determined if a simpler cipher mode (for example Electronic Code Book (ECB)) was used in which the same input data would always be encrypted to the same output data. For example if the word 0 happened to occur very frequently in the bitstream (perhaps because 0 was stored in configuration memory corresponding to areas of the device not required by the user design) then the encrypted value for 0 would occur frequently in the output data. An attacker could easily determine which areas of the device were not used by the customer design simply by looking for a bit pattern which occurred very frequently.

2. The feedback value left at the end of the encryption can be used as a Message Authentication Code (MAC) in the same way as the value computed by a secure hash algorithm. The MAC is also appended to the bitstream and verified after decryption.

In a preferred embodiment of this invention the Initial Value (IV) required in CBC mode is created using the on chip random number generator and saved as part of the header before the configuration information. As shown in FIG. 6, the IV 84 is stored unencrypted as part of the bitstream, its function is to ensure that if the same, or a similar bitstream, is encrypted with the same key a completely different set of encrypted data will be produced. The IV is particularly important if the on chip key memory is implemented in a technology which can only be written once (for example antifuse) or if the key is embedded in the maskwork. The IV is of less value in the situation where a new key is generated and stored each time a new bitstream must be secured as in a specific embodiment disclosed in application GB9930145.9.

Personalizing the FPGA

A modern SRAM programmed FPGA will be implemented on a CMOS process with 5 or more metal layers and transistors with a gate length of 0.18 microns. The die may be up to 2 cm on a side and contain tens of millions of transistors. In order to encode a particular cryptographic key onto the chip one or more of the optical masks used in manufacturing the chip must be altered. A very secure cipher such as triple DES requires a 168 bit key, so the task is to hide less than 200 bits of secure information in the massively complex manufacturing data for the FPGA. The technique of hiding a small amount of secret data in a much larger database is called steganography and has been studied by the cryptographic community for many years although most prior-art uses of steganography (see for example "Disappearing Cryptography," by Peter Wayner, published by Academic Press, ISBN 0-12-738671) have concerned techniques for hiding secret messages in long text files or images.

There are very many ways in which the small number of bits of key information could be embedded into the photomasks used in manufacturing the FPGA chip. For example, a shape in one place on the contact layer could connect a polysilicon wire to a ground signal (logic 0) on a metal wire and a shape in another place on the contact layer could connect the polysilicon signal wire to power (logic 1). Some of the considerations involved will be discussed in a later section.

Every time a new mask is required the FPGA manufacturer must prepare a database in electronic form and pay a service charge to a mask manufacturer. The total cost of preparing a mask may be on the order of $5000. This is negligible compared with the revenue generated from an FPGA manufactured in high volume. However, having multiple potential masks for a given product is also an inconvenience in the silicon foundry. Thus it is desirable from the manufacturer's point of view that as few mask variants as possible are required to implement the security scheme. Preferably, only a single mask out of the 15 or so required to manufacture an FPGA is changed to implement the key choice: since a mask may have more than 10 million shapes on it this is still a very large data set in which to hide the small amount of key data. In a currently preferred embodiment the first level contact mask which makes connections between first level metal and polysilicon and diffusion wires is changed to embed the key information.

There is a direct trade-off between the inconvenience associated with multiple masks and the degree to which the system inconveniences pirates. Here we will consider some reasonable choices a manufacturer might make. The correct choice will depend on commercial considerations and the perceived degree of threat at a given point in time.

1. The manufacturer might choose only to change the key whenever a new mask set was required. A new mask set might be required to increase production volume, when the design was transferred to another wafer fab, when the design was shrunk to a more aggressive process technology or when a correction was made to enhance yield or correct a problem. This policy would be very easy to implement and would inconvenience pirates to the extent that they could not rely on purchasing chips which would work with their copied bitstream: at any time the FPGAs might become incompatible with the bitstream.

2. The manufacturer might provide a new mask to the wafer fab every month (or other appropriate period) at which time the previous mask would be destroyed. Thus there would only ever be one mask approved for manufacturing at a given point reducing the complexity of the manufacturing process. With this method the pirate would know that a copied bitstream would only have a short lifetime in which it could be used to clone products.

3. The manufacturer might supply several possible masks to the fab and the mask to be used to process a particular wafer of set of wafers might be chosen at random at the time of manufacture. This is a more inconvenient method for the manufacturer but offers more protection against design piracy.

The second technique (retiring keys after a certain period) is particularly important since it provides a degree of damage limitation if an attacker succeeds in obtaining a secret key by limiting the period of time he can make use of it.

Strength of the Security System

When considering the design of a security system it is helpful to analyze the means by which an attacker might seek to defeat it. In this case the attacker has three main avenues of attack: attempting to obtain the secret key in order to decrypt the bitstream, attempting to access the unencrypted bitstream and attempting to remove the economic penalty for using a pirated bitstream.

There are several ways an attacker might attempt to obtain the secret key:

1. By exhaustive search of all possible keys: the attacker creates a bitstream file using the vendor CAD tools and presents in to an FPGA for encryption. He then repeatedly encrypts the same file using software running on a computer with all possible keys until he finds the key which results in the same ciphertext as was generated by the FPGA. At this point he has found the key stored on the FPGA.

2. By cryptanalysis, using more sophisticated techniques than a brute force key search. Such techniques, such as differential cryptography are described in the Schneier textbook cited above.

3. By physical analysis of the FPGA chip: for example conductive layers can be stripped back one at a time and viewed using a microscope to determine patterning information. This is a destructive technique in that it after the top layer is etched off the chip will no longer function.

4. By physical analysis of an operating FPGA chip for example by using a voltage contrast electron microscope to determine the logic levels present on signals.

5. By tampering with an operating FPGA chip for example by using a Focussed Ion Beam (FIB) machine to cut logic signals or connect logic signals to each other or to power supply lines.

6. By illegally attempting to gain access to mask work or key information from employees of the manufacturer or silicon fab.

These attacks can also be combined—for example if physical analysis provides some of the key bits then an exhaustive search could be used to determine the remaining unknown bits.

It is generally accepted that attacks 1 and 2 are not practical if a properly designed cipher with a long enough key is used. A preferred cipher would be triple DES with a 168 bit key used in cipher block chaining mode with an initial value (IV) generated by an on-chip random number generator. The use of cipher block chaining and a random initial value makes cryptanalysis based on patterns in the bitstream impractical. The use of a 168 bit key makes key search impractical for the immediate future. DES is a well known and well understood cipher which is generally accepted to be well designed. It should be understood that there are many other ciphers and use modes disclosed in standard textbooks which would provide strong security in this application.

Attack 3, physical analysis of FPGA artwork is certainly possible in theory but very difficult in practice and becoming more difficult with each generation of process technology. The attacker's main advantage is that the key has to be presented to the encryption unit, at which point it will be present on an identifiable set of wires. However, the FPGA designer can make it very difficult to trace the source of the signals on these wires by repeatedly changing conductive layer and intertwining the security signals with the many millions of logic signals on the chip. The attacker might also try to determine which signals were involved with the security circuits by obtaining artwork for two chips known to have different keys and using a computer to find the differences between the patterning. This technique can be combated by deliberately creating a large number of random differences on the artwork which are not related to the security information. It is also very difficult to obtain a complete set of artwork for an integrated circuit by microscopic analysis.

Attack 4 is also practical but can be made exceptionally difficult if care is taken in the design of the FPGA. Test equipment is available which will show the logic value on a conductor in an IC, theoretically all an attacker has to do is to either monitor the lines connecting the key to the encryption unit (to obtain the key) or the lines connecting the encryption unit to the configuration memory (to obtain the decrypted bitstream). The attacker's main problem is that the voltage contrast electron microscope requires a clear view to the lines. Thus the designer must place lines with sensitive signals on the lower conductive layers and ensure that they are obscured by signals on the higher layers. This is not difficult in a modem process with 6 or more layers of metal. If an attacker attempts to etch away or otherwise remove the top layers in order to get a view of the sensitive signals the designer can ensure that important signals will be destroyed which result in the chip becoming inoperative.

Attack 5 is also practical but the precautions required to thwart it are much the same as for attack 4. Sensitive signals should be placed on the lower conductive layers so that any attempt to interfere with them will require to cut through many other layers of metal and render the chip inoperative.

Attack 6 is probably the most cost effective way of obtaining key information for an attacker. The manufacturer must put processes in place so that only a small number of trusted employees have access to the key information and that it is stored securely.

Manufacturers of smart-card ICs for applications such as cellular telephones, digital cash and cable television face a very similar problem in preventing attackers from obtaining security information from their devices and many of the techniques they developed, for example the use of special overglass passivation on the die to prevent probing are applicable here.

The methods that an attacker could use to access the unencrypted bitstream are very similar to those used to gain access to the secret key. The unencrypted bitstream is placed in the FPGA configuration memory by the on chip security circuitry, thus an attacker could use attacks 4 and 5 to attempt to determine the values in the configuration memory. This is complicated by the fact that the bitstream is very large—perhaps hundreds of thousands of bits. The FPGA manufacturer must guard against this by ensuring that sensitive signals which carry configuration data are routed on the lower conductive layers. The attacker might also attempt to illegally gain access to the unencrypted design from employees of the FPGA customer.

Attacks on the Antipiracy Method

As well as attacks which attempt to determine the key or unencrypted bitstream information an attacker can try and find an economic way to use a copied bitstream. Several such attacks exist:

1. The attacker could act as an intermediary sorting FPGAs according to their key by loading various bitstreams known to have been generated on FPGAs with different keys and determining which bitstream activated properly. After sorting the FPGAs the attacker could distribute them to pirates who required FPGAs with particular keys.

2. The attacker might obtain several examples of the unit that he wished to copy in order to obtain bitstreams for several different FPGAs. This would increase his chances of having a bitstream that would work with a particular FPGA that he purchased.

3. The attacker might attempt to resell FPGAs that he could not use because of the bitstream security.

The main counter to all these attacks is to increase the number of variant FPGAs in the marketplace.

Distributing Key Information

One way of encoding key information in the artwork of the FPGA device is to create wires which attach to the key input of the encryption circuit and extend in a complicated pattern into the surrounding circuitry, changing conductive layer and direction at regular intervals to make it difficult for an attacker to trace them using microscopic analysis of the manufactured integrated circuit. At some point on these wires a connection would be made to power or ground to set the key bit to logic one or zero as appropriate.

Instead of connecting the wire to power and ground it would also be possible to connect them to a logic signal which had the correct value (1 or 0) at a particular instant in time. The advantage of this technique is that an attacker trying to observe the value on the signal using a voltage contrast microscope would have a much more difficult task since the key value would only be present on the wire for a few nanoseconds.

It can readily be appreciated that the larger the area of the chip in which key bits can be hidden the harder it will be for an attacker to determine their value. An alternative to the straightforward approach described above is to connect the encryption circuitry key input to a checksum circuit which is itself connected to the configuration memory as in FIG. 7. On power up, prior to loading a bitstream, an FPGAs control memory is normally set to all zeros or a fixed pattern or zeros and ones. This initial configuration ensures that the user logic on the FPGA is in a known state which does not draw static power. It is easy to use small changes in the masks to ensure some memory cells power up to either zero or one (see, for example, U.S. Pat. No. 4,821,233 to Hsieh for one way of achieving this). Only a small subset of memory cells control critical resources which must be set in a particular state to ensure there is no static power consumption (for example routing lines with more than one potential driver)—the initialization state of the remaining cells has no impact on device functionality and can be used to encode key data. Once a bitstream is loaded the initialization state is overwritten with the value specified in the bitstream.

Figure 7:
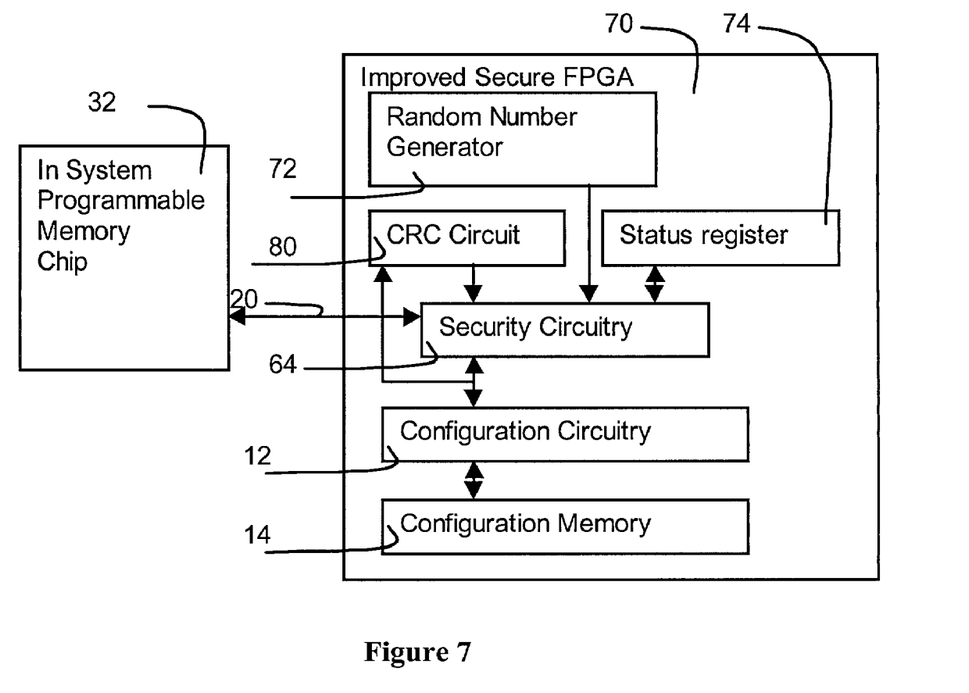
FIG. 7 shows a secure FPGA in which the key information is encoded into the device mask set and distributed throughout the configuration memory.

By setting the initial state of a random selection of memory cells (using changes to the masks) out of the hundreds of thousands in the device configuration memory the FPGA manufacturer can hide key information on the device. This key information can be extracted using a checksum circuit 80 to compute a checksum of the state of the memory cells using a standard Cyclic Redundancy Check (CRC) algorithm to collapse the hundreds of thousands of bits of configuration memory into a key which is preferably between 100 and 200 bits. CRC circuits are commonly used on prior art FPGAs to check bitstream integrity so this is may involve simply re-using a resource already present on the device. Thus the checksum circuit and the distributed key information replace the device ID register 62 in FIG. 5.

Distributing the key in this way creates a complex relationship between changes in memory cell artwork and key bits. With a suitable CRC polynomial all memory cells can potentially affect all key bits. There are potentially many ways of encoding a given key into the memory cells and determining the state of a given memory cell through analyzing the artwork gives no information about the value of a given bit in the key register.

This technique seems to make determination of the device key from microscopic analysis of the FPGA masks on a reasonably large sized FPGA so labor intensive as to be impractical. Attacks which use voltage contrast microscopes and FIB machines to observe and manipulate operational chips are still of concern and must be guarded against through careful routing of sensitive signals on lower conductive layers.

Although the configuration memory is a particularly attractive area in which to embed the key information the basic idea of using a CRC circuit to extract key information from a set of changes to a large logic circuit which do not affect its primary function could be applied to other structures on the device—for example a large area of random logic.

Similarly, although a CRC code has been described here, it will be appreciated that the requirement is for a code which summarizes a large amount of data into a much smaller sequence of bits. Many such codes are available in the art including the cryptographic hash functions described in the Schneier textbook.

Strengthening Legal Protection

The cryptographic protection described in application GB 9930145.9 and this application also makes it much easier to mount legal challenges to piracy:

1. The creator of the FPGA design will ship FPGAs in its products which have applied security themselves to an insecure bitstream. The preferred security technique involves generating a random initial value for cipher block chaining cryptography. In the preferred implementation the initial value has 64 bits. It is extremely unlikely that two bitstreams will have the same initial value. Thus every FPGA in a legitimate manufacturer's product will load a completely different encrypted bitstream. In a pirate's products every FPGA will load an identical bitstream.

2. The preferred security technique involves calculating a 64 bit Message Authentication Code (MAC) which is appended to the bitstream. The message authentication code can be created using the cipher in CBC mode used to encrypt the bitstream or a separate secure hash function. A MAC can be calculated and appended to a bitstream even if the bitstream or parts of the bitstream (such as copyright messages) are stored unencrypted. If either this code or the bitstream is changed in any way the FPGA can detect the mismatch and will not operate as disclosed in GB9930145.9. Thus, a pirate must use an exact copy of the pirated design including any data (such as a copyright message) inserted in the design to identify its ownership.

It is virtually impossible for a pirate to end up with an identical bitstream to one used in a legitimate manufacturer's product unless they copied it. Moreover, if the owner of the FPGA design keeps a record of the message authentication codes in the FPGAs shipped with its products it can tell which product the bitstream was pirated from and potentially identify the customer to whom the product was sold from its sales records.

These advantages are not dependent on each FPGA having a distinct key and are available when the mask programmed secret keys disclosed in this application are used.

Support for Secure Download

Many companies are becoming increasingly interested in methods for downloading FPGA bitstreams to a product after shipment to the end user. This allows a company to correct bugs in the design captured in the bitstream shipped with the product or to upgrade the product to a higher specification. This technique is particularly applicable to FPGAs which are installed in equipment connected to the internet or the telephone system.

There are outstanding security concerns with this technique—a malicious party or a simple error could result in an incorrect bitstream being downloaded. An incorrect bitstream could potentially damage the product or render it inoperative. The incorrect bitstream might be downloaded to a very large number of systems in the field before a problem became apparent. Thus, it is desirable to implement a cryptographic protocol to secure downloads of bitstream information. An attractive method of implementing this protection is to use a symmetric cipher in cipher block chaining mode. However, in this application the secret key installed in the equipment must be shared with computer software at the equipment manufacturer's facility in order that the manufacturer can encrypt the bitstream prior to transmission over the public network.

It is desirable that the secret key for securing bitstream download stored in the equipment is protected from unauthorized access. One straightforward way of doing this is to store it on the FPGA chip in a nonvolatile ID register. This is quite practical but it is not necessary if the FPGA is implemented according to this invention because the off-chip nonvolatile memory is already cryptographically secured. Thus the key for downloading bitstreams can be safely stored with the rest of the FPGA configuration information. This has the advantage that the FPGA is not limited to a particular cryptographic algorithm or key length for secure bitstream download. This is important because communications security protocols on the internet and telecommunications industry are in a continuous state of flux and are not under the control of any particular manufacturer. FPGA customers are likely to wish to use a variety of download security protocols according to the requirements of the particular system they are designing.

The structure of FIG. 6 disclosed in the applicants earlier application fulfills this requirement, however it requires an on chip nonvolatile ID register 62 in the FPGA. Using the technique suggested in this patent of encoding the secret key for secure configuration in the FPGA mask set the need for on-chip nonvolatile memory is removed. The security of the download protocol against unauthorized accesses is guaranteed as long as the on chip secret key is not compromised. A single secret key embedded in all FPGAs would provide the download security function. Using multiple mask sets embedding different secret keys would in addition to providing download security make it economically unattractive to clone the product.

CONCLUSIONS

The reader will see that the security system of this invention allows an FPGA or microcontroller with a large on-chip memory to securely restore the state of that memory from an off-chip nonvolatile memory while maintaining the ease of use of a prior art FPGA or microcontroller. Further, it can be implemented using a standard CMOS manufacturing flow since it does not require on-chip nonvolatile memory or chip specific customization.

While the technique has been described with reference to FPGAs once skilled in the art will recognize that it is equally applicable to any integrated circuit which must restore the state of an on-chip memory securely from an off-chip nonvolatile memory. Such chips would include Field Programmable Interconnect Components (FPICs), microcontrollers with on-chip SRAM program and data memory and hybrid chips containing, for example, a microcontroller and an area of programmable logic.

While the description above contains many specific details, these should not be construed as limitations on the invention, but rather as an exemplification of one preferred embodiment thereof. Many other variations are possible.

Accordingly, the scope of the invention should be determined not by the embodiments illustrated but by the appended claims and their legal equivalents.

What is claimed is:

1. A method comprising: storing a first secret key on an FPGA chip; causing the FPGA to calculate a message authentication code (MAC) corresponding to a user design; and storing the message authentication code with bitstream information in a nonvolatile memory external to the FPGA chip.

2. The method of claim 1 further comprising: storing copyright messages with the bitstream information; detecting unauthorized alterations to the bitstream using the message authentication code; and preventing bitstreams which have been altered from being used to configure an FPGA.

3. The method of claim 1 further comprising: recording the message authentication code along with corresponding identification information for a product containing the FPGA; and examining the message authentication code stored in the nonvolatile memory of a product containing a pirated FPGA design, which will enable determining the identity of the customer to whom the pirated FPGA was originally supplied using a record of MACs and corresponding product identification.

4. A method comprising: storing a first secret key on an FPGA chip; using the first secret key and a user design to calculate a message authentication code (MAC) corresponding to the user design; and storing the message authentication code with bitstream information in a nonvolatile memory external to the FPGA chip.

5. The method of claim 4 further comprising: storing copyright messages with the bitstream information; detecting unauthorized alterations to the bitstream using the message authentication code; and preventing bitstreams which have been altered from being used to configure an FPGA.

6. The method of claim 4 further comprising: recording the message authentication code along with corresponding identification information for a product containing the FPGA; and examining the message authentication code stored in the nonvolatile memory of a product containing a pirated FPGA design, which will enable determining the identity of the customer to whom the pirated FPGA was originally supplied using a record of MACs and corresponding product identification.

\* \* \* \* \*